(12) United States Patent
Ng et al.

(10) Patent No.: US 10,740,122 B2
(45) Date of Patent: Aug. 11, 2020

(54) SYSTEM MODULE OF SIMULATING MACHINE OPERATION SCREEN BASED ON NON-INVASIVE DATA-EXTRACTION SYSTEM

(71) Applicant: ADLINK TECHNOLOGY INC., New Taipei (TW)

(72) Inventors: Chua-Hong Ng, New Taipei (TW); Chao-Tung Yang, New Taipei (TW); Wei-Hung Chen, New Taipei (TW); Tsan-Ming Yu, New Taipei (TW); Shih-Hsun Lin, New Taipei (TW); Yang-Chung Tseng, New Taipei (TW); Chih-Fu Hsu, New Taipei (TW); Chien-Hsun Tu, New Taipei (TW); Ren-Yu Wu, New Taipei (TW); Chieh-Yuan Lo, New Taipei (TW); Chih-Kai Shiao, New Taipei (TW); Hsiao-Ling Chang, New Taipei (TW); Te-Cheng Tseng, New Taipei (TW); Chun-Liang Chen, New Taipei (TW)

(73) Assignee: Adlink Technology Inc., New Taipei (TW)

( * ) Notice: Subject to any disclaimer, the term of this patent is extended or adjusted under 35 U.S.C. 154(b) by 12 days.

(21) Appl. No.: 16/040,982

(22) Filed: Jul. 20, 2018

(65) Prior Publication Data
US 2019/0056962 A1 Feb. 21, 2019

(30) Foreign Application Priority Data

Aug. 17, 2017 (TW) .............................. 106128004 A
Dec. 1, 2017 (TW) .............................. 106142245 A

(51) Int. Cl.
G06F 3/048 (2013.01)
G06F 9/451 (2018.01)
G06K 9/00 (2006.01)

(52) U.S. Cl.
CPC .............. *G06F 9/451* (2018.02); *G06F 3/048* (2013.01); *G06F 9/452* (2018.02); *G06K 9/00463* (2013.01)

(58) Field of Classification Search
CPC .......... G06F 3/048; G06F 9/451; G06F 9/452; G06K 9/00463
See application file for complete search history.

(56) References Cited

U.S. PATENT DOCUMENTS 6,640,249 B1 * 10/2003 Bowman-Amuah ..... G06F 8/36
709/228
2013/0174064 A1 * 7/2013 Shikasho ................ G06F 3/048
715/762

(Continued)

*Primary Examiner* — Xuyang Xia
(74) *Attorney, Agent, or Firm* — Muncy, Geissler, Olds & Lowe, P.C.

(57) ABSTRACT

A system module applied to the machine controller for simulating a machine operation screen based on a non-invasive data-extraction system, is disclosed. An image capture device of the system module can receive an original operation screen outputted from the machine controller, and transmit the original operation screen to the non-invasive data-extraction system and a high-speed image process unit for extraction of the information shown on the operation screen. The software control system can extract the operational information of the machine controller in real time, to create a machine operation flow for generating a simulated machine operation screen which is then outputted to a screen of the machine controller. As a result, the site working staff can be provided with operational information associated with the machine in real time, for example, the operational information includes currently executed operation screen, (Continued)

position of mouse cursor and pop-up window detection result.

14 Claims, 10 Drawing Sheets

(56) References Cited

U.S. PATENT DOCUMENTS

2016/0098596 A1\* 4/2016 Gopalakrishnan ............................ G06K 9/00456
  382/224
2017/0056768 A1\* 3/2017 Aizawa ................. G06F 3/0338

\* cited by examiner

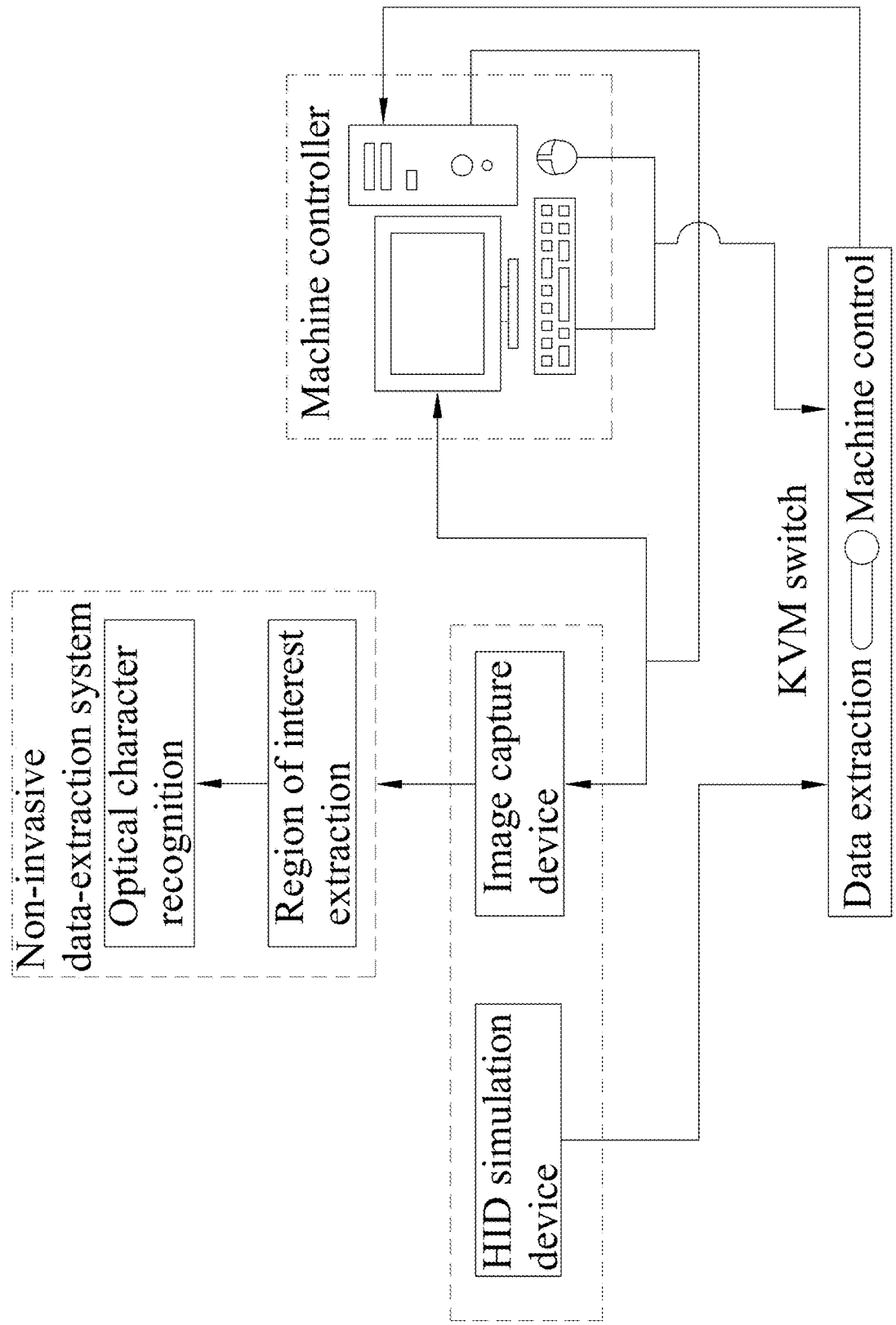
PRIOR ART FIG.10

SYSTEM MODULE OF SIMULATING MACHINE OPERATION SCREEN BASED ON NON-INVASIVE DATA-EXTRACTION SYSTEM

This application claims the priority benefit of Taiwan patent application numbers 106128004 and 106142245, filed respectively on Aug. 17, 2017 and Dec. 1, 2017.

BACKGROUND OF THE INVENTION

1. Field of the Invention

The present disclosure relates to a system module based on a non-invasive data-extraction system to simulate a machine operation screen. More particularly, in cooperation with the non-invasive data-extraction system, the system module can extract operational information of the machine controller in real time and provide the site working staff with a simulated original operation screen of the machine, thereby enabling the site working staff to obtain operational information associated with the machine in real time.

2. Description of the Related Art

In recent years, manufacturing industries are now facing a shortage of labor and rising awareness of environmental protection, increasing of labor and operating costs, and the pressure of transforming from labor-intensive industries to technical-intensive labor-intensive industries. Most of the manufacturing industries are aided by production-line automation technology and fixtures, so as to reduce manpower and working hours, and increase production capacity. Furthermore, in the automatic production line, different processing apparatuses or machines are disposed in different workstations of the plant site to perform production flows of processing, inspection, cleaning, assembly, quality control, warehousing and transportation, thereby producing the required components and finished products.

Furthermore, with the development of automation technology in production-line, machine with higher productivity and an open architecture must be used to meet the operational demand. Therefore, manufacturers have developed various industrial computers applicable for industrial control and used for control between the machine of the automation apparatus and a master device However, in the manufacturing process with the automation apparatus, it is hard to upgrade the old machine controller to a networked device. For example, it is difficult to upgrade the machine controller in expansion of hardware equipment and software system modifications; for this reason, in order to maintain the normal operation of such old machines, most of the manufacturers use an non-invasive data-extraction system to obtain the information of the control machine.

Please refer to FIG. 10, which shows a schematic view of architecture of a conventional non-invasive data-extraction system. In the conventional non-invasive data-extraction system, a screen image outputted from the machine controller is served as a data source, and the screen image is also transmitted to the data-extraction system and shown on the screen of the machine controller, so that the image recognition process can be performed for region of interest (ROI) extraction and optical character recognition (OCR) to convert the information shown on the screen image into digital information.

The machine controller can be switched, by a KVM switch, to control the data-extraction system or the keyboard/mouse of the machine controller; however, the required information may be shown on different operation screens of the machine controller, so the site working staff must quickly switch the operation screen of the machine controller to extract the machine state and data. However, in this operational condition, the site working staff usually watches that the pages shown on the machine operation screen are switched quickly and the data-extraction system is in operation to extract the data of the machine controller in real time, so that the site working staff is unable to control the machine controller and is limited in operating the functions of overall system. In other words, in order to control the machine, the site working staff must pause the data-extraction system first. It stops the data-extraction system from extracting the data of the machine controller, and the site working staff is unable to view machine state and data in real time. Therefore, what is needed is to develop a system module to solve above-mentioned problem.

SUMMARY OF THE INVENTION

In order to solve the conventional problem that the site working staff is unable to control the machine through the machine controller while the data-extraction system is extracting the data shown on the operation screen outputted from the machine controller, the inventor collects associated data and continuously performs tests and modifications according to years of research experience, thereby developing the system module which can be in cooperation with the non-invasive data-extraction system to simulate the machine operation screen.

An objective of the present invention is that a machine operation program of the machine controller can generate an original operation screen for controlling the machine, and an image capture device of the system module can receive an image of the original operation screen outputted from the machine controller, and transmit the image of the original operation screen to the non-invasive data-extraction system and the high-speed image process unit to extract the information shown on the operation screen. In cooperation with the non-invasive data-extraction system, the software control system can extract the operational information of the machine controller in real time, so as to create an operational flow of the machine controller and generate a simulated machine operation screen according to the operational flow, and the image output device outputs the image of the simulated machine operation screen to a screen of the machine controller. With assistance of the high-speed image process unit, the site working staff can be provided with the operational information associated with the machine in real time, for example, the operational information can include the currently-executed operation screen, the position of the mouse cursor and the pop-up window detection result. Furthermore, the signal-receiving device and the HID simulation device can transmit a control signal to the machine controller, thereby providing a more accurate machine control procedure.

Another objective of the present invention is that the high-speed image process unit can perform, in real time, the operations below. First, the high-speed image process unit can recognize a specific page-pattern shown on the original operation screen, and note a page-ID, obtained from the recognition result, in the image of the operation screen, so that the software control system can periodically update the operational page corresponding to the page-ID; and, the high-speed image process unit can quickly compare an icon image of the mouse cursor in the operation screen image, to position a coordinate of the mouse cursor and transmit the coordinate to the software control system for analysis, thereby confirming whether the mouse cursor is moved to the control position defined in the software control system; and, the high-speed image process unit can define a threshold for an image change, so as to detect occurrence of the pop-up window according to a large amount of the image changes.

According to the pop-up window detection result, the high-speed image process unit can transmit an error or alarm/warning message-box or other warning message to a central monitoring system, thereby reporting the occurrence of warning message including error or abnormal condition.

Another objective of the present invention is that the software control system includes two operation modes including an editing mode and an execution mode; and in the editing mode, the software control system is mainly used to create an operational flow of the machine controller, and the operational flow records relationships between the operational pages to be shown on the machine operation screen. The information for planning each operation screen includes the page-ID of the operational page to be shown on the machine operation screen; an image of the operation screen used to compare the control component embedded in the machine operation screen, for creation of the operational flow of the machine controller; a coordinate and a range of a general control component for labelling the control components which can switch to other operational page; a coordinate and a range of the home/return control component for labelling the control component which can switch to the home page or the return page. The software control system can automatically label the control component on the machine operation screen, and find the home/return control component according to the predefined image patterns. The HID simulation device can transmit the command corresponding to the control component, to the machine controller, and browse the operational pages of the machine operation screen one by one according to Tree Traversal Algorithm, so as to create the operational flow chart of the machine operation program. The operational flow chart can record all operational pages of the machine operation program, all control components embedded in each operational page and the target operational pages of the control components after the control components are switched.

Another objective of the present invention is that, in the execution mode, the software control system is in cooperation with the non-invasive data-extraction system, and the software control system can combine the signal receiving device and the operational flow of the machine controller to analyze the information of operation performed on the machine by the site working staff, so as to generate the simulated machine operation screen. If necessary, the software control system can transmit the control signal generated by the HID simulation device in response to the control component, to the machine control program, so as to enable the machine control program to execute the command inputted by the site working staff.

The other objective of the present invention is that the system module in cooperation with the non-invasive data-extraction system can provide the site working staff with the simulated machine operation screen corresponding to the original operation screen, so that the data extraction operation for machine is not interrupted when the site working staff views the machine state and data in real time. As a result, the high-speed image process unit of the system module can reduce the workload of the central processor of the software control system and ensure the image process to be performed in real time, and transmit the image of the operation screen and an image process result to the machine controller, so that the software control system can perform a processing procedure according to the image process result. The icon of the mouse cursor transmitted by the high-speed image process unit can replace the function of human eye, to confirm whether the mouse cursor move to control position defined in the software control system, thereby completing closed-loop control for the mouse. According to the coordinate of the mouse cursor transmitted from the high-speed image process unit and the recognition result for the operation screen image, the software control system can provide a more accurate machine control process, and the software control system processes the control signal inputted from the keyboard/mouse, so to provide a customized control item for filter setting function to prevent the site working staffs false action.

BRIEF DESCRIPTION OF THE DRAWINGS

FIG. 10 is a schematic view of an architecture of a conventional non-invasive data-extraction system according to the prior art.

DETAILED DESCRIPTION OF THE PREFERRED EMBODIMENTS

Figure 1:
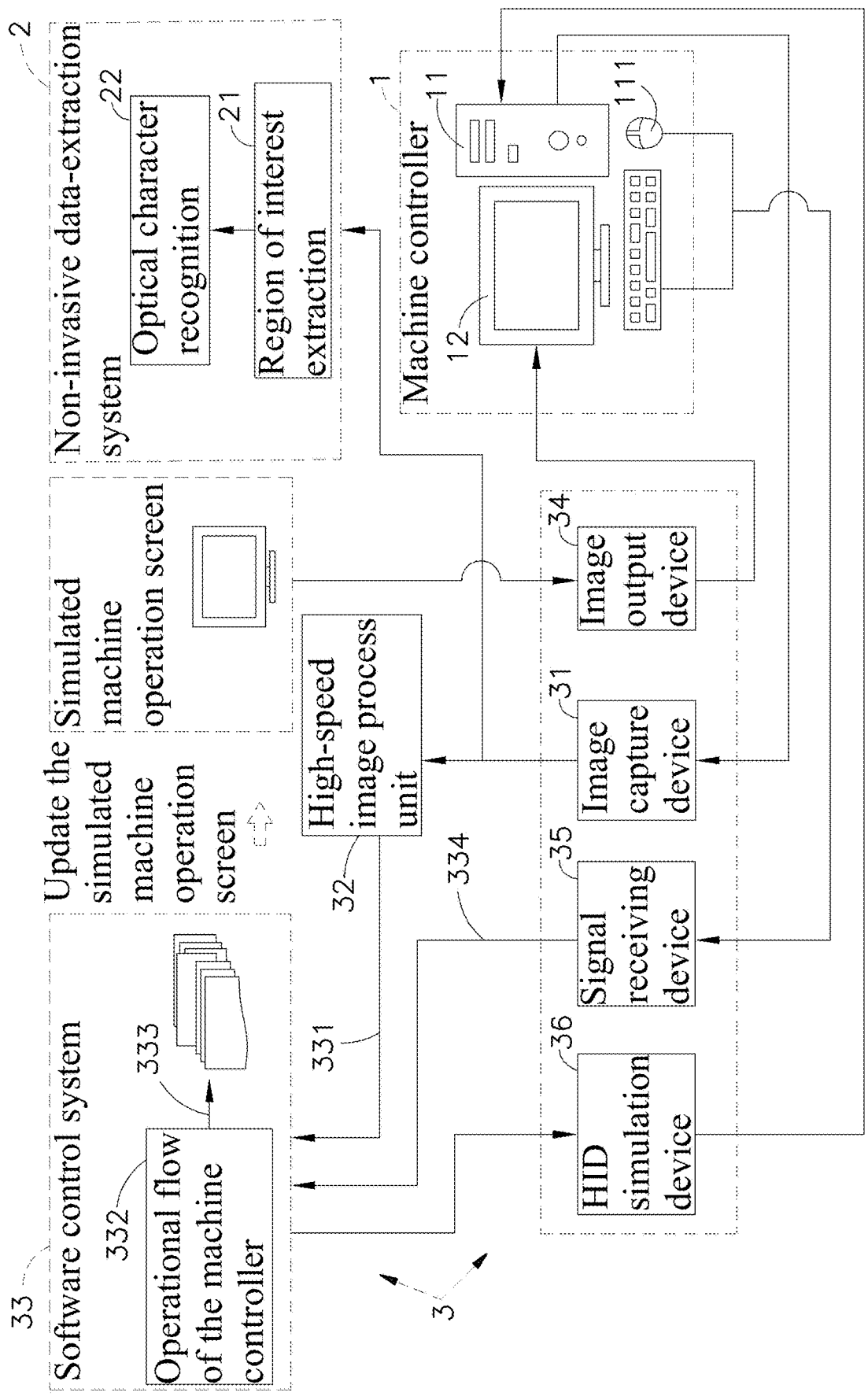
FIG. 1 is a block diagram of a system module using the non-invasive data-extraction system to extract data of the machine controller and outputting a simulated machine operation screen, in accordance with an embodiment of the present invention.
Figure 2:
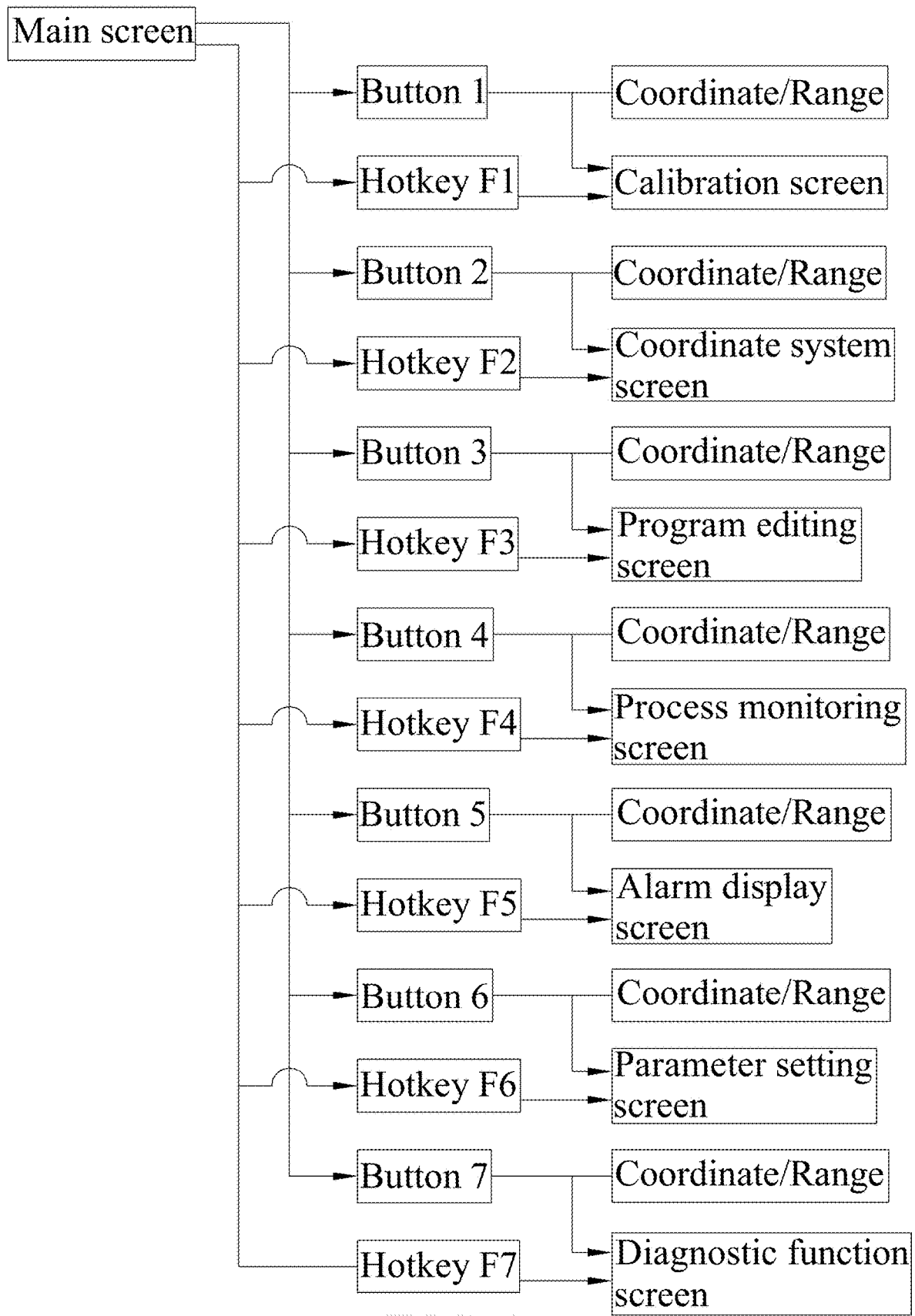
FIG. 2 is a structural view of a machine operation program executed by a machine controller of an embodiment of the present invention.
Figure 3:
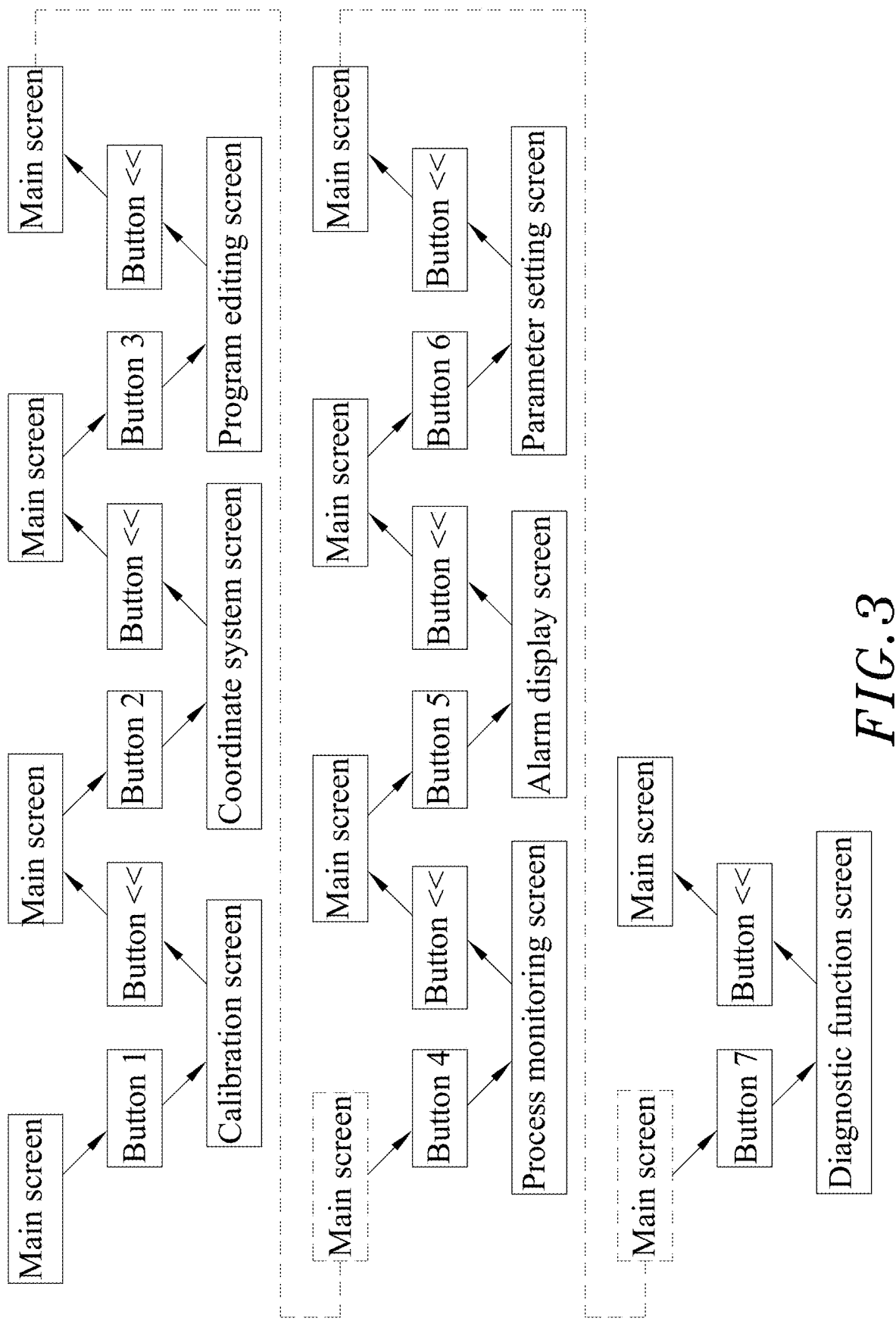
FIG. 3 is an operational flow chart of the simulated machine operation screen created by the system module of the present invention.
Figure 4:
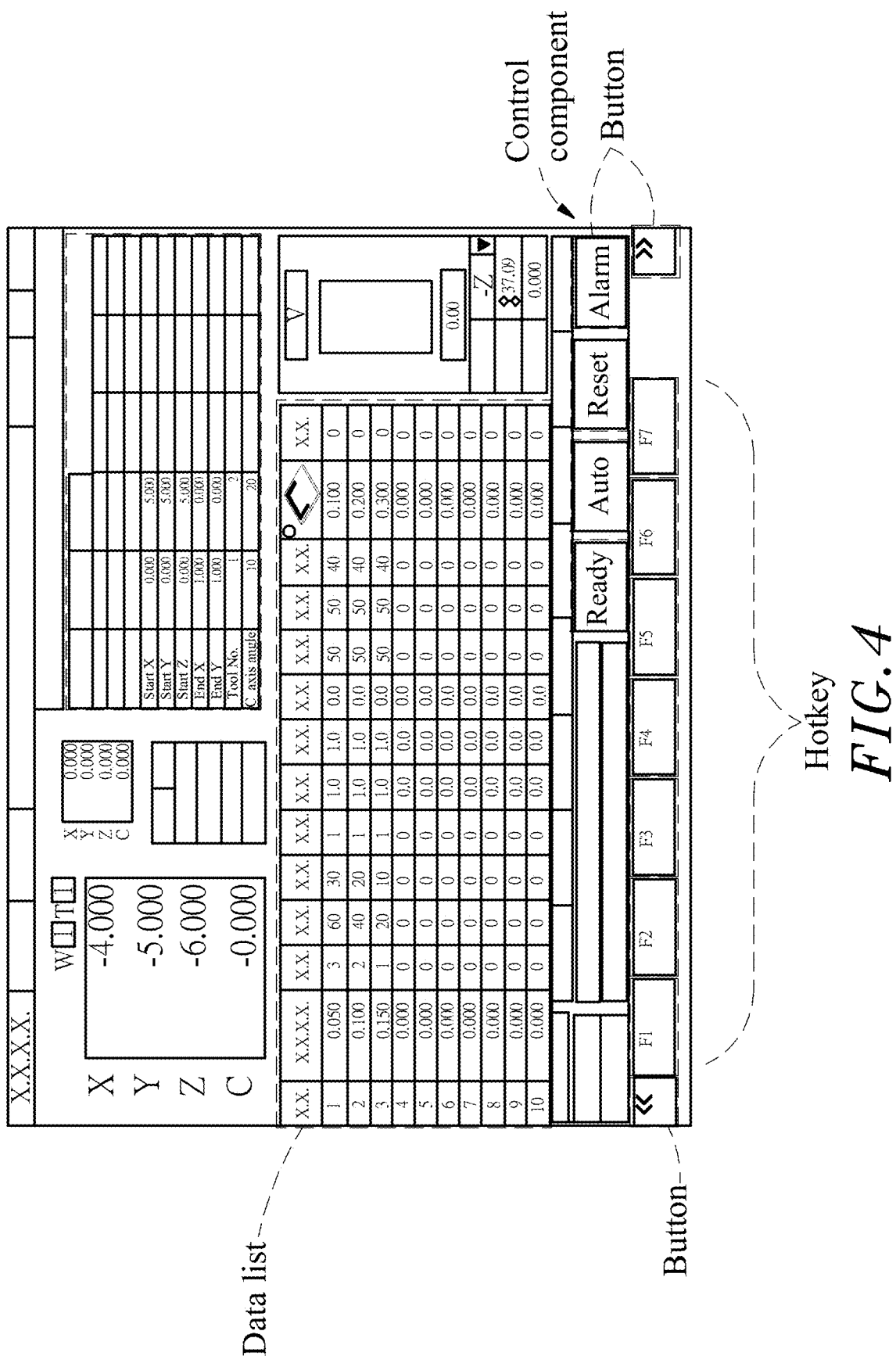
FIG. 4 shows a main screen of the simulated machine operation screen of an embodiment of the present invention.
Figure 5:
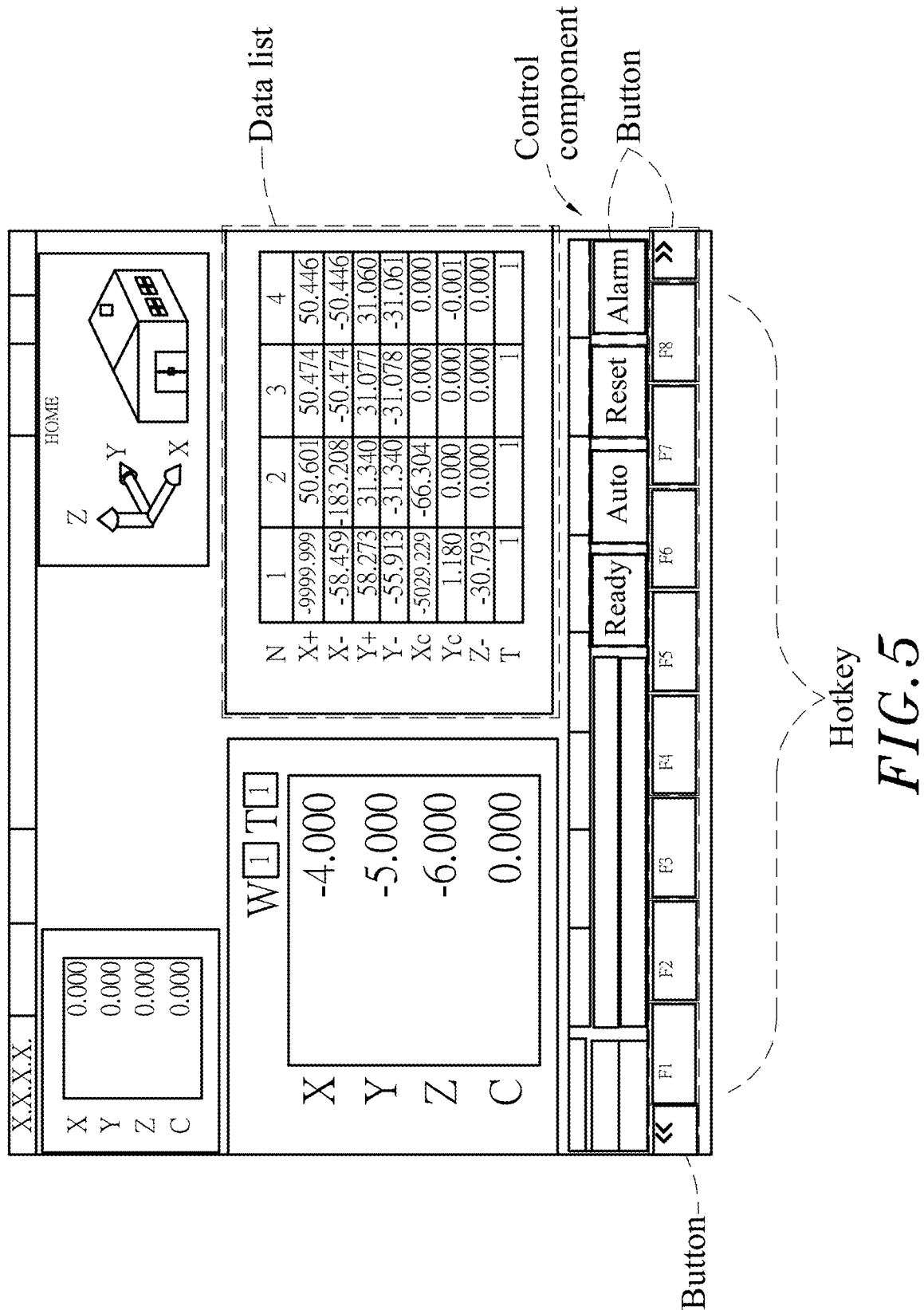
FIG. 5 is an operational page of a calibration screen of an embodiment of the present invention.
Figure 6:
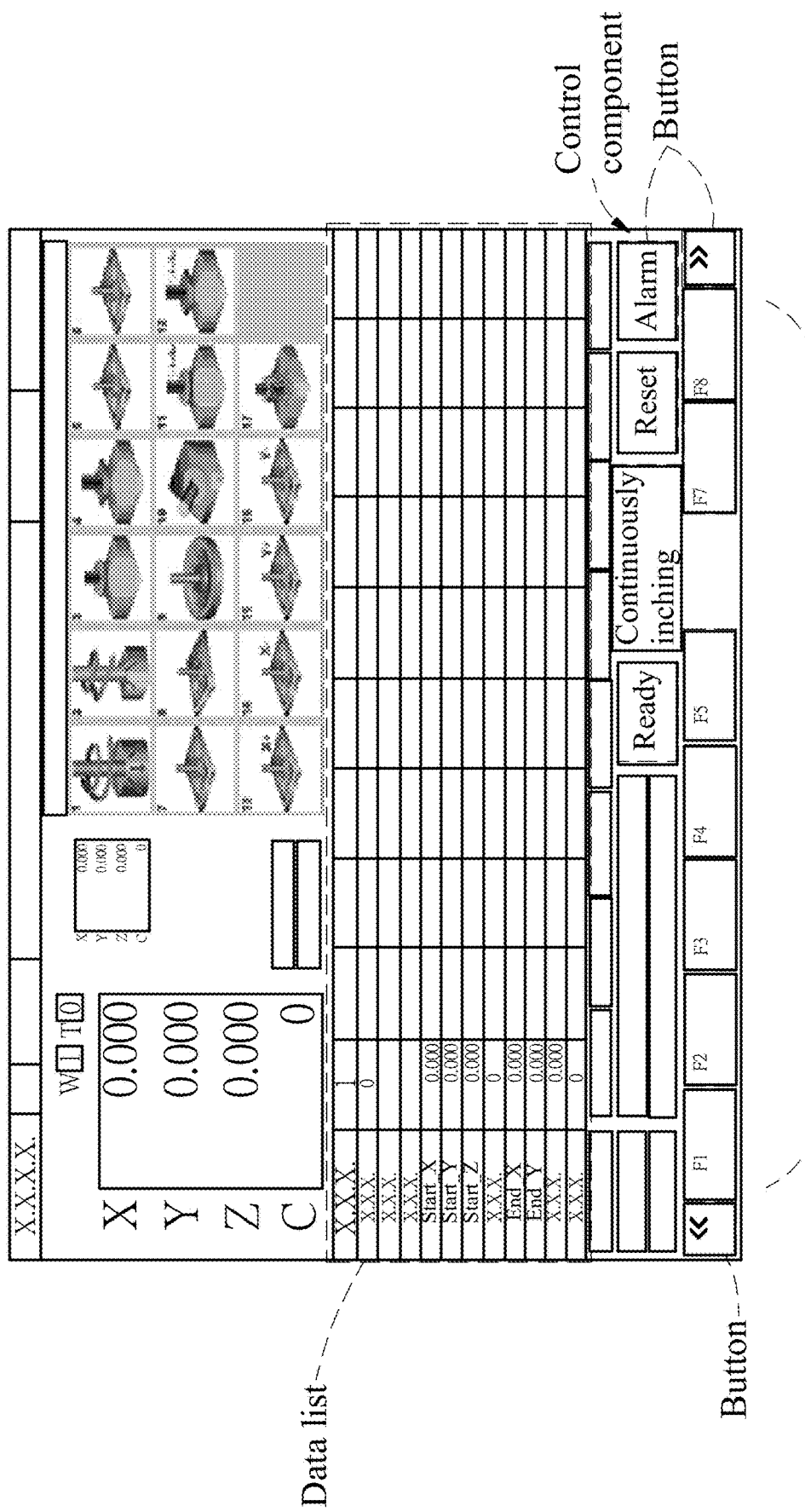
FIG. 6 shows an operational page of a program editing screen of an embodiment of the present invention.
Figure 7:
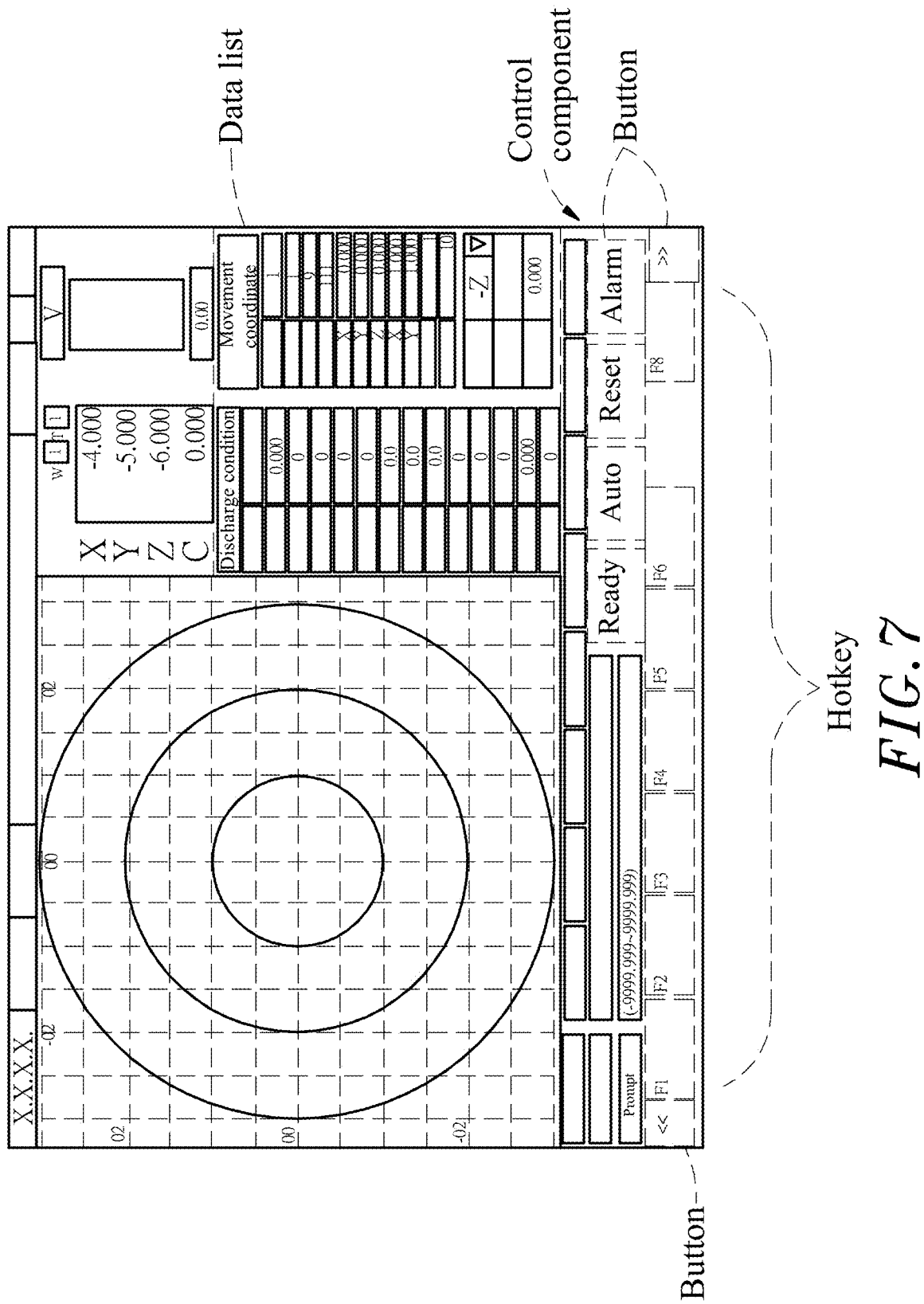
FIG. 7 is an operational page of process monitoring screen of an embodiment of the present invention.
Figure 8:
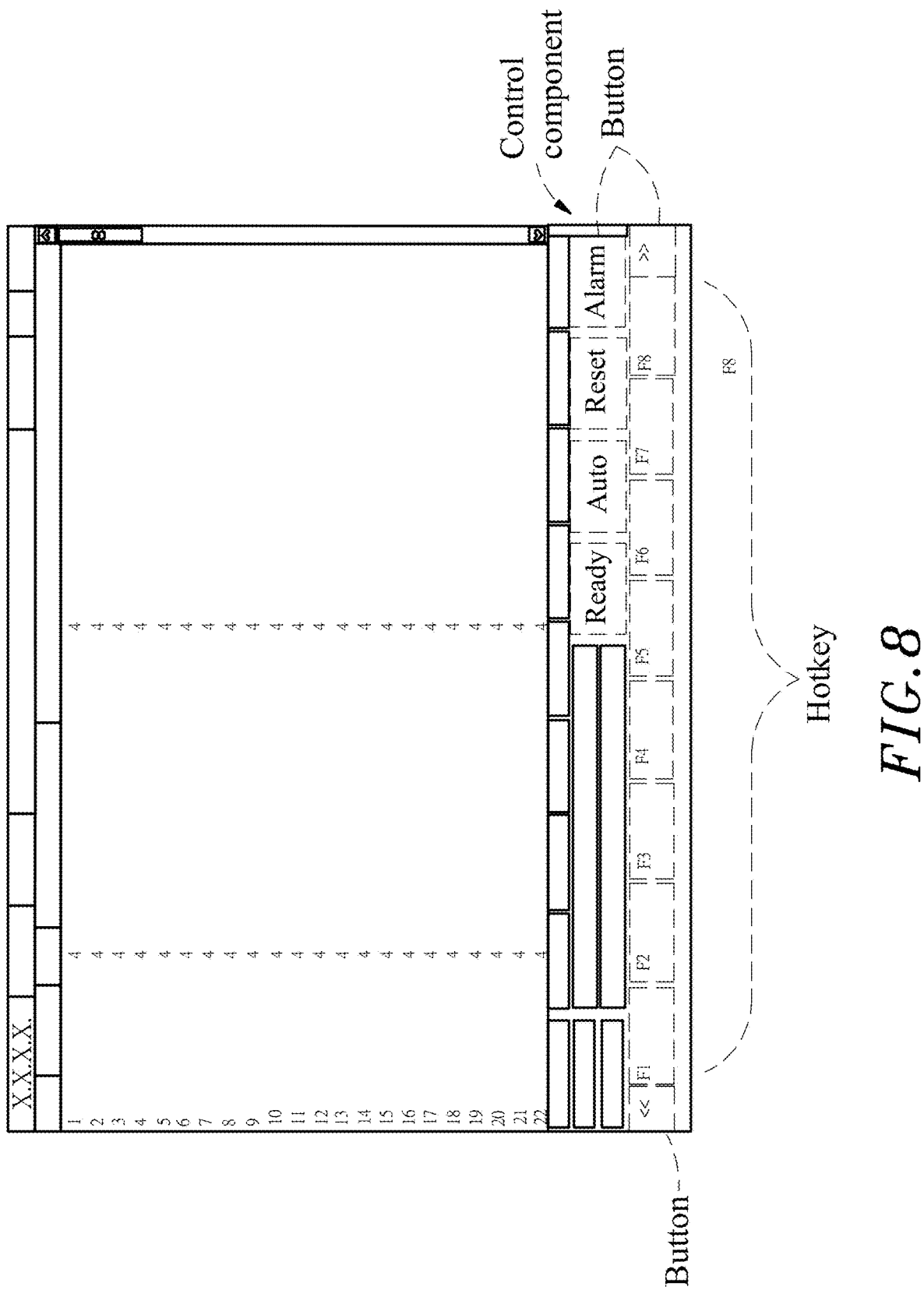
FIG. 8 is an operational page of warning screen of the present invention.

Please refer to FIGS. 1-3, which show block diagram of the system module extracting the data of the machine controller in cooperation with the non-invasive data-extraction system and outputting the simulated machine operation screen, structural view of the machine operation program executed by the machine controller, and the operational flow chart of the simulated machine operation screen created by the system module. In the embodiment of the present invention, a system module configured to simulate the machine operation screen based on (in cooperation with) the non-invasive data-extraction system, can be applied to a machine controller 1. The machine controller 1 includes a built-in machine operation program with multi-page control programs, and the machine controller 1 is electrically connected to, but not limited to, a desktop computer, a workstation, a server, a notebook computer, or other the console for controlling operation of the machine. The console can include a host computer 11 inside, and the host computer 11 is electrically connected to a screen 12 and a keyboard/mouse 111.

The machine electrically connected to the machine controller 1 in this embodiment is illustrated by using a multi-axial hole or deep-hole electric discharge machine. However, the practical application of the present invention is not limited thereto; for example, the machine can also be automation equipment or processing equipment used in the semiconductor industry, printed circuit board industry, precision electronics industry, optoelectronics industry, or machinery manufacturing industry. The machine controller 1 can execute the machine operation program that generates the operation screen originally displayed by the machine. Take the operation screen of the EDM machine as an example; the operation screen includes the operational pages of home screen, calibration screen, program editing screen, execution monitoring screen, alarm display screen and system parameter setting screen in a sequential order. Upon the design or operation requirements, the operational pages of the operation screen can also include the operational page of coordinate system screen or diagnostic function screen. FIGS. 4 through 9 are main screen and other operational pages of the operation screens of an embodiment of the present invention, and these operational pages can display data associated with machine operation and manufacturing state, such as parameters of working mode, working coordinate, processing depth, processing time, processing current and pulse width; however, the machine operation program of the machine controller 1 may generate different operation screens upon the machine to be controlled, and the operation screen displayed on the screen 12 can be the original operation screen of the machine, so that these operational pages and the original operation screen are described together in contents below.

Furthermore, the machine controller 1 is electrically connected to a system module 3 based on (in cooperation with) an non-invasive data-extraction system 2. The system module 3 includes an image capture device 31, a high-speed image process unit 32, a software control system 33, an image output device 34, a signal receiving device 35 and a human interface device (HID) simulation device 36. The software control system 33 can drive the image capture device 31 to capture the operation screen image originally displayed by the machine operation program outputted from the machine controller 1, and transmit the original operation screen image to the non-invasive data-extraction system 2 and the high-speed image process unit 32 for processing. The operation screen image can be used as an image data source for the optical character recognition software. The non-invasive data-extraction system 2 performs a region of interest extraction (ROI) 21 and an optical character recognition 22 on the received operation screen image, to convert the information shown on the operation screen image to the digital information. In an embodiment, the high-speed image process unit 32 can be served as a post-stage processing unit for processing the image of the machine operation screen extracted by the image capture device 31. The associated image process algorithm can be implemented in a chip or circuit such as field programmable gate array (FPGA), application-specific integrated circuit (ASIC)/application-specific standard product (ASSP) or micro-processor, to perform high-speed function of image recognition, image comparison, motion detection and the mouse cursor positioning, and periodically update the operational page on the machine operation screen.

The non-invasive data-extraction system 2 is mainly used to extract the information shown in the operation screen, and the software control system 33 of the system module 3 is configured to receive the digital information extracted by the non-invasive data-extraction system 2, and use the high-speed image process unit 32 to recognize specific page-pattern information shown on the original operation screen, and then note or label the page-ID (that is, a page identity) attribute data, which is obtained based on an recognized result, in the image of the operation screen, so that the software control system 33 can periodically and correctly update the operational page 331 according to the page-ID every cycle, and store the image of the machine operation screen captured by the image capture device 31 in a buffer built-in the software control system 33. The operation screen of the machine is a temporarily-stored image outputted from the image output device 34 to the machine controller 1; for example, a typical producer-consumer working mode uses the buffer as a data cache, and the software control system 33 can receive all or part of the digital information extracted by the non-invasive data-extraction system 2, and analyze the machine operational information transmitted from the high-speed image process unit 32, and perform an image post-process to generate a simulated machine operation screen. For example, the original machine operation screen can be added with effects of the mouse cursor moving and keyboard input, or each operational page of the machine operation screen can be embedded with a control component such as a dialog box, a button or a data list, and the control component is linked with a specific processing function.

Furthermore, the signal receiving device 35 is configured to receive the control signal inputted from the physical keyboard/mouse 111, and the control signal is then transmitted to the software control system 33 by using a HID data buffer and HID detection/data forwarder function, for further processing. According to the position of mouse clicking, the software control system 33 can find a control component 334 corresponding to the position in the operational flow, and also can temporarily store the key-in data inputted from the keyboard. By using a microcontroller of the software control system 33, the HID simulation device 36 can simulate the keyboard/mouse to generate a simulated control signal, and temporarily store the simulated control signal in the HID data buffer, and perform the HID detection/data forwarder functions to respond the control signal inputted from the keyboard/mouse according to the positions of mouse-moving and mouse-clicking. The software control system 33 can use the HID simulation device 36 to transmit the simulated control signal, which is generated in response to the movement of the mouse cursor and action of the mouse clicking the control component, to the host computer 11 of the machine controller 1, so that when the software control system 33 is switched to the operational page corresponding to the clicked control component, the keyboard can be used to input actual data.

In this embodiment, the high-speed image process unit 32 can perform following operations in real time. For example, the high-speed image process unit 32 can recognize the specific page-pattern shown on the original operation screen, and note the page-ID, according to the recognition result, in the image of the operation screen, so that the software control system 33 can periodically update the operational page 331 corresponding to the page-ID. The high-speed image process unit 32 can compare, in high-speed, an icon image of the mouse cursor shown on the operation screen, and transmit the icon image of the mouse cursor to the software control system 33 for analysis and also calculate a coordinate of the mouse cursor locator, thereby confirming whether the movement of the mouse cursor meets control position of the software control system 33. The high-speed image process unit 32 can define a threshold for an image change, and detect occurrence of a pop-up window according to a large amount of image changes. According to the pop-up window detection result, the high-speed image process unit 32 transmits an error, an alarm/warning messagebox or other warning message to a central monitoring system, for example, central monitoring system can be a computer integrated manufacturing (CIM) system, the manufacturing execution system (MES) or other computer process integration system, thereby reporting occurrence of warning message such as error or abnormal condition.

The specific page-pattern means the image pattern representative of each operational page of the operation screen of the machine, and the specific page-pattern is preset or predefined by a user. A screen image (such as a main screen image or the operational page) can include multiple image patterns. For the machine operation screen image captured by the image capture device 31, the high-speed image process unit 32 transmits the image patterns to the software control system 33 to analyze the site working staff's control on the machine through the machine controller 1. The threshold for the image change can be used to check whether the image of the operation screen is stable, for example, the threshold can be used to detect occurrence of the pop-up window, and prevent the high-speed image process unit 32 from extracting the machine operation screen to cause unexpected false action while the machine operation screen is changing page.

The software control system 33 includes two operation modes including an editing mode and an execution mode. In the editing mode, the software system is used to create an operational flow 332 of the machine controller 1, and the operational flow can describe a relationship between the operational pages on the machine operation screen. In order to create the operational flow of the machine controller, each operation page needs to have information including a pageID which is shown on the machine operation screen to represent the currently-executed operational page, an image of the operation screen which is used to compare the control component embedded in the machine operation screen, a coordinate and a range of general control component for labelling the control component which is used for switching to other the operational page, a coordinate and range of the home/return control component for labelling a special control component used for switching to the home page or the return page.

By using the image of the operation screen of the machine captured by the image capture device 31, and using the machine operational information transmitted from the highspeed image process unit 32, the software control system 33 can automatically label possible control components, such as buttons or display lights, on the machine operation screen by using image recognition, comparison and analysis manner. Furthermore, the software control system 33 can find the home/return control components based on the predefined image pattern, and use the HID simulation device 36 to transmit the command corresponding to the movement of the mouse cursor and the action of the mouse clicking the control component, to the machine controller 1; and software control system 33 can perform Tree Traversal Algorithm to visit all nodes of the tree data structure one by one, to completely browse all operational pages of the machine operation screen, thereby creating the operational flow chart of entire machine operation program. Finally, the operational flow chart can record all the operational pages of the machine operation program, all control components embedded in the operational pages, and the target operational page 333 in response to the control component's being clicked (that is, in response to the action of clicking the control component). The software control system 33 can analyze the machine operational information which is transmitted from the high-speed image process unit 32 after image process, to update the state of the software control system 33.

When being operated in the execution mode, the software control system 33 is in cooperation with the non-invasive data-extraction system 2 and uses the image capture device 31 to capture the image of the operation screen of the machine outputted from the machine control program of the machine controller 1. The non-invasive data-extraction system 2 extracts the information shown on the operation screen, and updates the operational page 331 corresponding to the page-ID transmitted from the high-speed image process unit 32. The software control system 33 in cooperation with the signal receiving device 35 and the operational flow of the machine controller can analyze the information of operation performed on the machine by the site working staff, so as to generate the simulated machine operation screen image. If necessary, the software control system 33 can use the HID simulation device 36 to transmit the control signal generated in response to movement of the mouse cursor and the action of mouse clicking the control component, to the machine controller 1, so that the command of the control signal can be inputted to the machine control program, to enable the machine control program to execute the command inputted by the site working staff.

Figure 9:
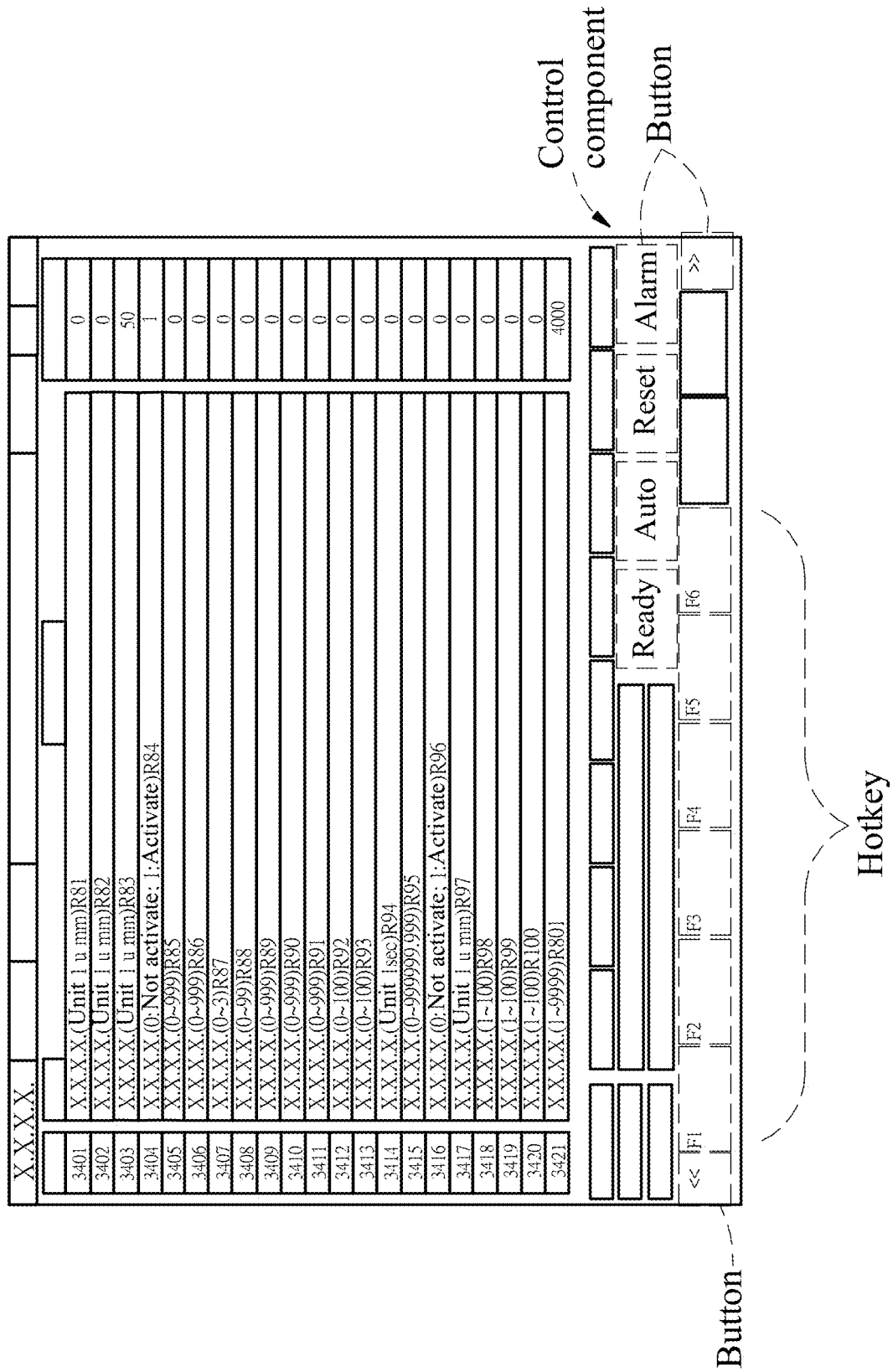
FIG. 9 is an operational page of parameter setting screen of the present invention.

As shown in FIGS. 2 and 3, in this embodiment, the machine controller 1 includes buttons and hotkeys corresponding to switching operations between the operation screens generated by the machine operation program. For this reason, each operational page needs to record a relationship between other operational pages therewith. For example, the main screen must record a hotkey (F6) for the system parameter-setting screen (as shown in FIG. 9) and the coordinate and range of the button corresponding to the hotkey (F6). FIGS. 2 and 3 show complete relationship between the machine operation screen and other operational pages. When the software control system 33 receives the control signal of the keyboard/mouse 11 from the host computer 11 through the signal receiving device 35, for example, the control signal indicative of mouse clicking or the hotkey of the keyboard pressing, the software control system 33 can compare the control signal with the data labelled in the operational pages contained in the machine operational information transmitted from the high-speed image process unit 32, and perform process corresponding to a comparison result. For example, the home/return control component can be clicked to switch the operational page. After the relationships between the operational pages is defined clearly, the user can plan a complete flow to browse all operational pages of the machine operation screen for the software control system 33, according to the relationship between the operational pages. That is, the software control system 33 can create an operational flow chart of the machine operation program for the machine controller 1. Furthermore, the buttons and hotkeys used for switching the operational pages on the machine operation screen can include, but not limited to, buttons one to seven, and hotkeys F1 to F7. In actual application, the buttons, the hotkeys and a switching order thereof in the operation screen can be set or modified upon specific usage condition or authorization. The embodiments shown in FIGS. 2 to 9 of the present invention are merely for exemplary illustration, and the claim scope of the present invention is not limited thereto.

In this embodiment, when the site working staff operates the keyboard/mouse 111 of the host computer 11, the signal receiving device 35 can receive the control signal inputted from the keyboard/mouse 111, and transmit the inputted data to the software control system 33 for processing. When the inputted data is merely to change the operational page, the software control system 33 selects the corresponding machine operation screen image from the machine operation screen images stored in the buffer. When the inputted data relates to setting of the machine parameters, the input control component of the software control system 33 is to respond and the inputted data is temporarily stored in the buffer of the software control system 33, and after the software control system 33 switches to the target operational page on the machine operation screen already, the HID simulation device 36 can transmit the command of the control signal to the machine control program of the machine controller 1, so as to enable the machine controller 1 to execute the data input operated by the site working staff.

In this embodiment, the software control system 33 executes following operation procedure to perform the function of the machine controller 1 simulating the operation of the machine. During each cycle, the non-invasive data-extraction system 2 can extract the information shown in the operation screen, and store the machine operation screen image captured by the image capture device 31, and then analyze the machine operational information transmitted from the high-speed image process unit 32, and update the state of the software control system 33, such as the position of the mouse cursor, the operational page of the operation screen currently executed by machine control program, and records of the control components in the operational pages included in the operational flow of the machine controller. When the occurrence of the pop-up window is detected, the warning message including error or warn message-box can be transmitted to the central monitoring system, and the HID simulation device 36 can be used to release the error/warning message-box, so that the non-invasive data-extraction system 2 can continuously perform data extraction procedure on the machine operation screen; the software control system 33 can receive the control signal transmitted from the signal receiving device 35, compare the range of the control component of the operational flow with the coordinate position of mouse clicking action operated by the site working staff, and after the software control system 33 determines that the position of mouse clicking is within the effective range of the control component of the operational flow, the image output device 34 can output the simulated machine operation screen linked with the clicked control component, to the screen 12 of the machine controller 1. The signal receiving device 35 can be used to temporarily store the input data of the keyboard operated by the site working staff, and after the machine operation screen is switched to the target operational page already, the HID simulation device 36 can be used to actually input data to the machine controller 1.

The signal receiving device 35 can receive the control signal of keyboard inputted by the site working staff through the machine controller 1, and transmit the control signal to the software control system 33 for processing. The HID simulation device 36 can forward the control signal to the machine controller 1. For this reason, the control items of the software control system 33 can be set according to specific usage condition or authorization, for example, an equipment engineer can be permitted to access machine parameter setting function only, and an operator is not permitted to access the control items of setting function, but is permitted to view machine state and data.

In summary, the main concept of the present invention is that the machine operation program of the machine controller 1 can generate the original operation screen of the machine, and the image capture device 31 of the system module 3 can receive the operation screen outputted from the machine controller 1, and transmit the operation screen to the non-invasive data-extraction system 2 and the high-speed image process unit 32 to extract the information shown on the operation screen, so that the software control system 33 can extract the operational information of the machine controller 1 in real time, and create the operational flow of the machine controller to generate the simulated machine operation screen, and the image output device 34 outputs the simulated machine operation screen image to the screen 12 of the machine controller 1. With assistance of the high-speed image process unit 32, the site working staff can obtain, in real time, the operational information associated with the machine, such as the currently-executed operational page, the positioning of the mouse cursor and the pop-up window detection result. The signal receiving device 34 and the HID simulation device 35 can be used to provide a more accurate machine control procedure.

The present disclosure disclosed herein has been described by means of specific embodiments. However, numerous modifications, variations and enhancements can be made thereto by those skilled in the art without departing from the spirit and scope of the disclosure set forth in the claims.

What is claimed is:

1. A system module of simulating a machine operation screen based on an non-invasive data-extraction system, is applied to a machine controller and configured to control a machine, and the system module comprises:

an image capture device configured to receive an original operation screen outputted from a machine control program of the machine controller, and transmit the original operation screen to the non-invasive data-extraction system to extract information shown on the original operation screen of the machine;

a high-speed image process unit configured to receive the original operation screen of the machine, and perform an image process on the original operation screen to provide machine operational information, wherein the high-speed image process unit recognizes a specific page-pattern shown on the original operation screen and notes a page-ID, obtained from a recognition result, in an image of the original operation screen, and compares an icon of a mouse cursor on the original operation screen to position a coordinate of the mouse cursor, and define a threshold for an image change to detect occurrence of a pop-up window on the original operation screen;

a software control system configured to receive the information from the non-invasive data-extraction system, and analyze the machine operational information transmitted from the high-speed image process unit, wherein the software control system periodically updates an operational page of the original operation screen according to the page-ID, and compare a coordinate and a range of a control component embedded in the operational page, to create an operational flow of the machine controller for generating a simulated machine operation screen image, and wherein when the high-speed image process unit detects occurrence of the pop-up window, the high-speed image process unit outputs a warning message;

an image output device configured to output the simulated machine operation screen image linked with the control component, to a screen of the machine controller;

a signal receiving device configured to transmit a control signal of a keyboard/mouse inputted from the machine controller, to the software control system for processing, and wherein the signal receiving device is configured to find the control component in the operational flow according to a position of mouse-clicking; and an HID simulation device configured to simulate the keyboard/mouse to transmit a corresponding control signal to the machine controller, so as to enable the machine controller to execute an inputted command.

2. The system module according to claim 1, wherein the machine controller comprises a host computer and the screen electrically connected to the host computer, and the host computer is electrically connected to the keyboard/mouse.

3. The system module according to claim 1, wherein the machine controller comprises a machine operation program, and the machine operation program generates the original operation screen of the machine, and the operation screen comprises the operational pages of a main screen, a calibration screen, a program editing screen, a process execution monitoring screen, a warning screen, or a system parameter setting screen.

4. The system module according to claim 1, wherein the non-invasive data-extraction system is configured to receive the original operation screen image of the machine control program outputted from the machine controller, and perform region of interest extraction and optical character recognition on the original operation screen image, to convert information shown on the original operation screen image into digital information.

5. The system module according to claim 1, wherein the operation screen image captured by the image capture device of the system module is stored in a buffer built in the software control system to serve a temporarily-stored image which is to be outputted by the image output device to the machine controller.

6. The system module according to claim 1, wherein the high-speed image process unit is a post-stage processing unit for the image of the operation screen captured by the image capture device, and an image process algorithm is implemented in a FPGA, ASIC/ASSP, or a micro-processor.

7. The system module according to claim 1, wherein the specific page-pattern recognized by the high-speed image process unit of the system module is an image pattern preset by the user for each of the operational pages of the machine operation screen, and the high-speed image process unit transmits the image pattern to the software control system to analyze the site working staffs control operation for the machine through the machine controller, and the threshold for the image change is used to define whether the image of the operation screen becomes stable, thereby detecting the occurrence of the pop-up window.

8. The system module according to claim 1, wherein the software control system is operated in one of an editing mode and an execution mode, and in the editing mode, the software control system creates the operational flow of the machine controller, and the operational flow is configured to describe relationships between the operational pages of the machine operation screen;

wherein in the execution mode, the software control system is based on the signal receiving device and the operation flow to analyze the information of operation performed on the machine by the site working staff, so as to generate the simulated machine operation screen image, and the HID simulation device transmits the control signal generated in response to the control component, to the machine controller.

9. The system module according to claim 8, wherein, in the editing mode, the software control system plans information of each of the operational pages, and the planned information comprises:

the page-ID shown on the operation screen for representing the operational page;

the image of the operation screen used to compare the control component embedded in the operation screen for creating the operational flow of the machine controller;

a coordinate and a range of the control component for labelling the control component used to switch to other the operational page; and a coordinate and a range of a home/return control component for labelling the control component used to switch to a home page or return page.

10. The system module according claim 9, wherein the software control system automatically labels the control component on the operation screen of the machine, and find the home/return control component according to predefined image patterns, and a HID simulation device transmits the command corresponding to the control component, to the machine controller, and the operational pages of the operation screen is browsed one by one according to Tree Traversal Algorithm, thereby creating the operational flow chart of the machine operation program, and the operational flow chart records the operational pages, the control components embedded in the operational pages, and a target operational page in response to an action of clicking the control component.

11. The system module according to claim 1, wherein the software control system stores the image of the operation screen captured by the image capture device, and analyzes the updated state of the machine operational information transmitted from the high-speed image process unit, and the updated state comprises a position of the mouse cursor, the operational page of currently-executed the operation screen of the machine control program, and a record of the control components of the operational pages corresponding to the operational flow.

12. The system module according to claim 1, wherein when the high-speed image process unit detects occurrence of the pop-up window, the software control system reports the warning message comprising error message-box or warn message-box, to a central monitoring system, and after the HID simulation device releases the warning message, the non-invasive data-extraction system continuously performs the process of extracting the data shown the operation screen.

13. The system module according to claim 1, wherein the software control system receives the control signal transmitted from the signal receiving device, and compares the range of the control component of the machine operation flow and the position of mouse clicking in response of the site working staffs operation of mouse clicking, and when the software control system confirms the position of mouse clicking within an effective range of the control component according to the machine operation flow, the image output device outputs the simulated machine operation screen linked with the clicked control component, to the screen of the machine controller.

14. The system module according to claim 1, wherein the software control system temporarily stores the data, which is inputted by the site working staff through keyboard, in the signal receiving device; and wherein after the operational page is switched completely, the HID simulation device performs actual data input to the machine controller.

* * * * *